US011927340B2

(12) United States Patent
Liu

(10) Patent No.: US 11,927,340 B2
(45) Date of Patent: Mar. 12, 2024

(54) REFLECTIVE DEVICE AND LIGHT SOURCE MODULE

(71) Applicant: OPPLE LIGHTING CO., LTD., Shanghai (CN)

(72) Inventor: Chaobo Liu, Shanghai (CN)

(73) Assignee: OPPLE LIGHTING CO., LTD., Shanghai (CN)

( * ) Notice: Subject to any disclaimer, the term of this patent is extended or adjusted under 35 U.S.C. 154(b) by 19 days.

(21) Appl. No.: 16/396,329

(22) Filed: Apr. 26, 2019

(65) Prior Publication Data

US 2019/0249845 A1 Aug. 15, 2019

Related U.S. Application Data

(63) Continuation of application No. PCT/CN2017/106582, filed on Oct. 17, 2017.

(30) Foreign Application Priority Data

Oct. 26, 2016 (CN) ......................... 201610948477.1
Oct. 26, 2016 (CN) ......................... 201621172757.X

(51) Int. Cl.
*F21V 7/04* (2006.01)
*F21V 5/04* (2006.01)
(Continued)

(52) U.S. Cl.
CPC ................ *F21V 7/048* (2013.01); *F21V 5/04* (2013.01); *F21V 7/005* (2013.01); *F21V 7/0091* (2013.01);
(Continued)

(58) Field of Classification Search
CPC ... F21V 5/02; F21V 3/02; F21V 7/048; F21V 7/0091
See application file for complete search history.

(56) References Cited

U.S. PATENT DOCUMENTS 2,015,235 A * 9/1935 Rolph .................. F21V 7/0091
362/340
6,616,305 B1 * 9/2003 Simon .................. F21V 7/0091
362/309
(Continued)

FOREIGN PATENT DOCUMENTS

CN 101109491 A 1/2008
CN 101576230 A 11/2009
(Continued)

OTHER PUBLICATIONS

International Search Report and Written Opinion (including English translation) issued in PCT/CN2017/106582, dated Jan. 18, 2018, 18 pages.

*Primary Examiner* — Fatima N Farokhrooz
(74) *Attorney, Agent, or Firm* — Arch & Lake LLP

(57) ABSTRACT

A reflective device and a light source module are provided. The reflective device is transparent, which includes a light entrance, a light exit, and a reflective wall between the light entrance and the light exit. The light entrance is smaller than the light exit, and the reflective wall includes an inner surface and an outer surface, the inner surface including a plurality of sawtooth structures arranged continuously, each of the sawtooth structures including a first refractive surface and a second refractive surface which are intersected with each other, two ends of each of the sawtooth structures being respectively extended toward the light entrance and the light exit. The light source module provided by the present disclosure adopts the above-mentioned reflective device, the reflective device being transparent, the inner surface of the reflective device including the plurality of sawtooth structures arranged continuously.

18 Claims, 7 Drawing Sheets

(51) Int. Cl.
*F21V 7/00* (2006.01)
*F21Y 103/10* (2016.01)
*F21Y 115/10* (2016.01)

(52) U.S. Cl.
CPC ............. *F21V 7/04* (2013.01); *F21Y 2103/10* (2016.08); *F21Y 2115/10* (2016.08)

(56) References Cited

U.S. PATENT DOCUMENTS

| | | | | | |
|---|---|---|---|---|---|
| 6,698,908 | B2 * | 3/2004 | Sitzema, Jr. | F21V 5/02 | 362/255 |
| RE40,227 | E * | 4/2008 | Cobb, Jr. | G02B 5/12 | 359/831 |
| 7,600,894 | B1 * | 10/2009 | Simon | F21V 5/046 | 362/244 |
| 8,033,693 | B2 * | 10/2011 | Tan | G02B 19/0061 | 362/346 |
| 9,995,439 | B1 | 6/2018 | Shum et al. | | |
| 2003/0185012 | A1 * | 10/2003 | Sitzema, Jr. | F21V 13/04 | 362/346 |
| 2004/0141324 | A1 | 7/2004 | Sales | | |
| 2008/0019138 | A1 | 1/2008 | Otte et al. | | |
| 2008/0219008 | A1 * | 9/2008 | Schaefer | F21V 7/005 | 362/297 |
| 2009/0225430 | A1 | 9/2009 | Barnes et al. | | |
| 2009/0279296 | A1 | 11/2009 | Chang | | |
| 2010/0039579 | A1 * | 2/2010 | Park | G02F 1/133603 | 362/97.3 |
| 2010/0165240 | A1 * | 7/2010 | Cho | G02F 1/133603 | 349/61 |
| 2012/0033445 | A1 * | 2/2012 | Desmet | G02B 6/0038 | 362/606 |
| 2013/0077320 | A1 * | 3/2013 | Duan | F21V 7/0091 | 362/297 |
| 2013/0083539 | A1 * | 4/2013 | Dimitriadis | F21V 29/83 | 362/297 |
| 2014/0063803 | A1 * | 3/2014 | Yaphe | F21V 21/005 | 362/249.03 |
| 2014/0268747 | A1 * | 9/2014 | Demuynck | F21V 15/015 | 362/297 |
| 2014/0313758 | A1 | 10/2014 | Nakaya | | |
| 2015/0252982 | A1 * | 9/2015 | Demuynck | F21V 15/015 | 362/184 |
| 2016/0258593 | A1 | 9/2016 | Rodgers | | |
| 2016/0312977 | A1 * | 10/2016 | Jiang | F21K 9/68 | |
| 2017/7008226 | | 3/2017 | Xie et al. | | |
| 2018/0010770 | A1 * | 1/2018 | Bao | F21S 8/04 | |

FOREIGN PATENT DOCUMENTS

| | | | | |
|---|---|---|---|---|
| CN | 102748706 | * | 10/2012 | F21V 5/04 |
| CN | 102748706 | A | 10/2012 | |
| CN | 103958962 | A | 7/2014 | |
| CN | 104747932 | A | 7/2015 | |
| CN | 204665032 | U | 9/2015 | |
| CN | 105570731 | A | 5/2016 | |
| CN | 205402432 | U | 7/2016 | |
| CN | 106439733 | A | 2/2017 | |
| CN | 205956947 | U | 2/2017 | |
| CN | 206093923 | U | 4/2017 | |
| CN | 107036051 | A | 5/2017 | |
| CN | 207350249 | U | 5/2018 | |
| EP | 0354961 | A1 * | 2/1990 | G02B 19/0028 |
| EP | 3134675 | A1 * | 3/2017 | F21S 4/22 |
| WO | 201177032493 | A1 | 3/2017 | |

* cited by examiner

REFLECTIVE DEVICE AND LIGHT SOURCE MODULE

CROSS-REFERENCE TO RELATED APPLICATIONS

The application is based upon and claims the priority of PCT patent application No. PCT/CN2017/106582 filed on Oct. 17, 2017 which claims the priority of Chinese Patent Application No. 201610948477.1 filed on Oct. 26, 2016 and Chinese Patent Application No. 201621172757.X filed on Oct. 26, 2016, the entire contents of all of which are hereby incorporated by reference herein for all purposes.

TECHNICAL FIELD

The present disclosure relates to the field of illumination technologies, in particular to a reflective device and a light source module.

BACKGROUND

Existing reflectors based on electroplating are widely applied in commercial lighting fixtures, for example, are applied in lighting fixtures, such as a downlight, a spotlight, a ceiling lamp and an outdoor lamp. The reflectors based on electroplating are mainly used for secondary light distribution for the light emitted by a light source. The reflector based on electroplating generally comprises a reflective surface coated by a layer of metal film, and the light output efficiency of the lighting fixtures using reflectors based on electroplating is low because the light absorption of the material of the coating is relatively large, for example, the loss rate of a silver coating is 5%, the loss rate of a gold coating is 9%, and the loss rate of an aluminum coating is as high as about 12%.

SUMMARY

An objective of the present disclosure is to solve the above-mentioned technical problems, and provides a reflective device and a light source module with high light output efficiency.

To achieve the above-mentioned objective, the embodiments of the present disclosure provide a reflective device. The reflective device is transparent and comprises a light entrance, a light exit and a reflective wall between the light entrance and the light exit, and the light entrance is smaller than the light exit, and the reflective wall comprises an inner surface and an outer surface, the inner surface comprising a plurality of sawtooth structures arranged continuously, each of the sawtooth structures comprising a first refractive surface and a second refractive surface intersected with each other, and two ends of each of the sawtooth structures being respectively extended toward the light entrance and the light exit.

To achieve the above-mentioned objective, the embodiments of the present disclosure also provides a reflective device, wherein the reflective device is transparent and comprises a light entrance, a light exit and a reflective wall between the light entrance and the light exit. The reflective wall comprises an inner surface and an outer surface, the inner surface comprising a plurality of sawtooth structures arranged continuously, each of the sawtooth structures comprising a first refractive surface and a second refractive surface intersected with each other, two ends of each of the sawtooth structures being respectively extended toward the light entrance and the light exit, and an optical space being formed among the light entrance, the light exit and the inner surface of the reflective wall. The reflective device is configured to allow part of incident light, which enters from the light entrance, to be incident onto the reflective wall, to be incident into the optical space by reflection of the reflective wall, and to exit by passing through the light exit; and to allow another part of the incident light, which enters from the light entrance, to directly pass through the optical space and exit from the light exit.

To achieve the above-mentioned objective, the embodiments of the present disclosure also provide a light source module, comprising: the reflective device and the light-emitting assembly; and the light-emitting assembly is at the light entrance of the reflective device.

BRIEF DESCRIPTION OF THE DRAWINGS

The described accompany drawings herein is provided for further understanding of the present disclosure, and forms a part of the present disclosure. The illustrative embodiments and the description of the present disclosure are used to explain the present disclosure, and not construed as inappropriate limitations to the present disclosure. In the accompany drawings.

DETAILED DESCRIPTION

In order to make objects, technical solutions and advantages of the present disclosure apparent, the technical solutions of the present disclosure will be clearly and completely described in connection with the specific examples and corresponding drawings of the present disclosure. Apparently, the described examples are only partial examples of the present disclosure and not all the examples. All other examples obtained by one of ordinary skill in the art based on the examples of the present disclosure without creative efforts shall fall within the scope of protection of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
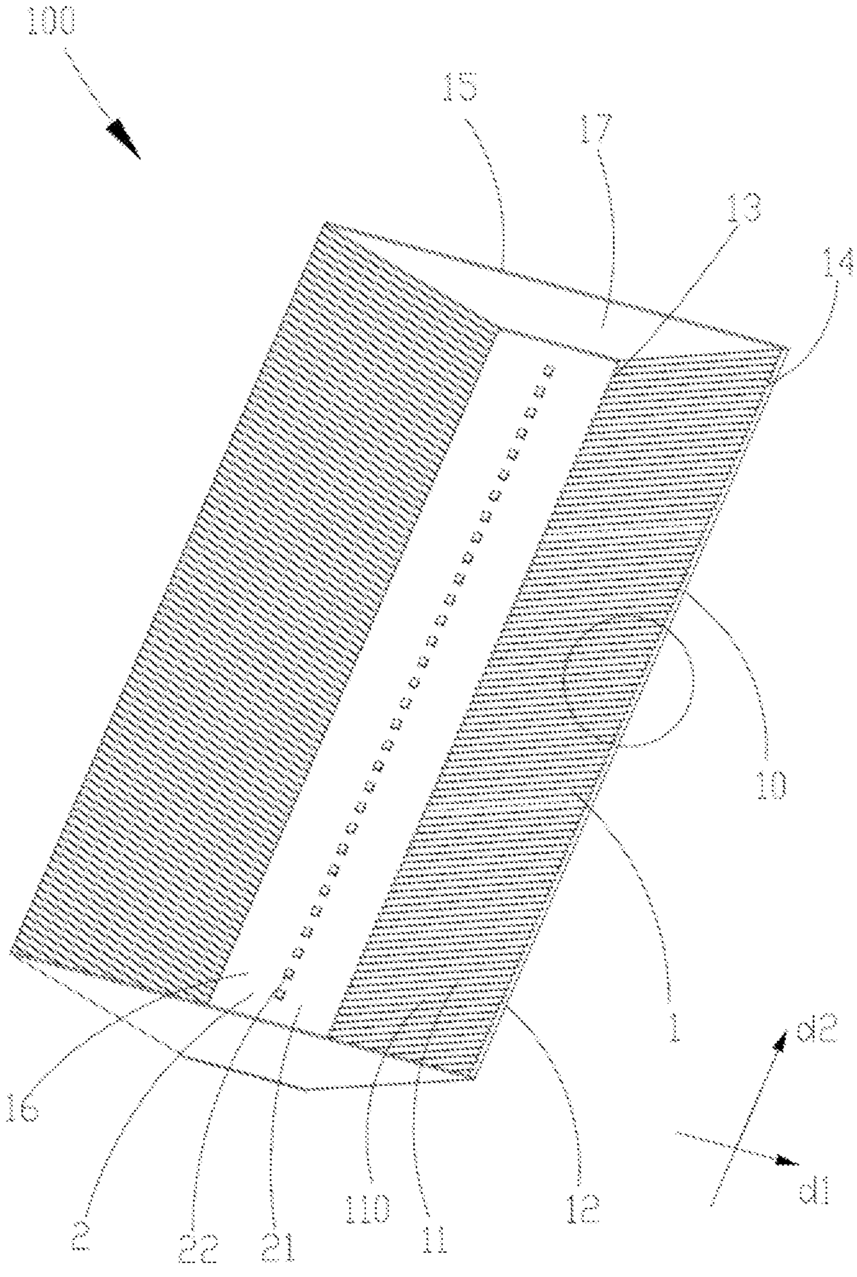
FIG. 1 is a schematically structural view of a light source module provided by a first embodiment of the present disclosure.

As shown in FIG. 1, the first example of the present disclosure provides a light source module 100, which comprises a reflective device 10 and a light-emitting assembly 2. In the present example, the reflective device 10 adopts two lenses 1 which are opposite to each other as a reflective wall, and provides a connection plate 15 between two lenses 1, so as to form a complete reflective device. The connection plate 15 and the lenses 1 may surround an enclosure space as shown in FIG. 1. The connection plate may also be provided at a bottom surface, that is, at a position where the light-emitting assembly 2 as shown in the figure locates, and the connection plate and the lens 1 form a structure with bottoms being connected and with tops being open. In other examples, some structures, such as a light source board, an outer wall of the module, of the module may be served as the connection plate. In some other examples, no connection plate may be adopted and a reflective device in a square or polygon shape may be formed by four or more lenses. It should be noted that a portion of light emitted from the light-emitting assembly 2 directly exits from the inner surface 11 of the lens 1 after the portion of light is refracted, reflected, and refracted again by the lens 1, and then exits from the light exit, another portion of light emitted from the light-emitting assembly 2 directly exits from the inner surface (not labeled) of the connection plate 15 by passing through the light exit after the another portion of light is reflected by the connection plate 15. The light source module 100 may be applied in lighting fixtures, such as a ceiling lamp, a lamp for illuminating fresh foods, and an outdoor lamp.

The elements in the light source module 100 provided by the first example of the present disclosure, and the connections between the elements will be specifically described in the following.

As shown in FIG. 1, the light-emitting assembly 2 comprises a light source board 21 and a plurality of light-emitting units 22 on the light source board 21. Specifically, the plurality of light-emitting units 22 are arranged along the length direction d2 of the light source board 21, and are provided in the central region of the light source board 21. In the first example of the present disclosure, the plurality of light-emitting units 22 may be arranged in one row or more rows along the length direction d2 of the light source board 21. The light-emitting units 22 may be LED light-emitting units.

Figure 3:
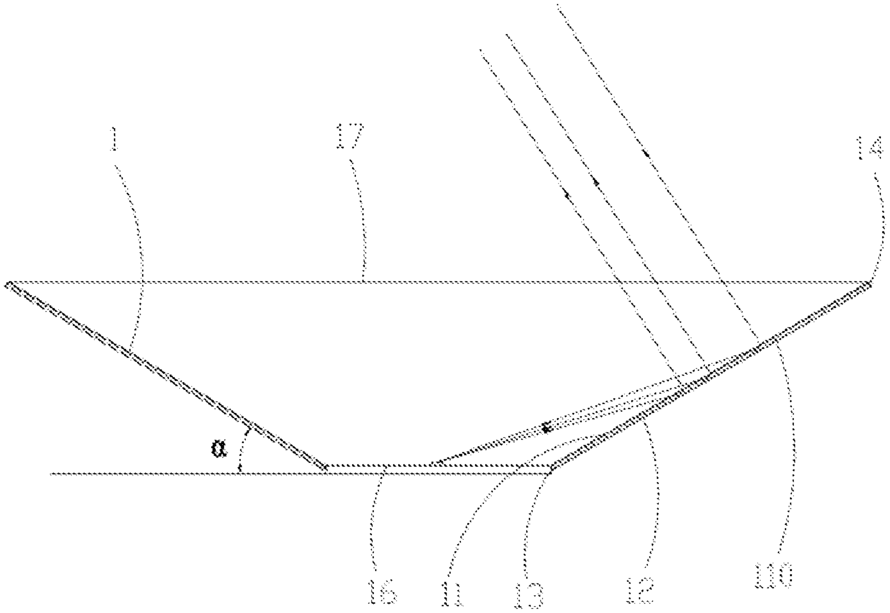
FIG. 3 is a schematic diagram of an optical path of a light source module provided by the first example of the present disclosure.

As shown in FIG. 1 and FIG. 3, the lenses 1, which serve as the reflective wall of the reflective device, are respectively in a plate shape, have a uniform thickness, and are provided at two sides of the light source board 21 along the width direction d1. In other examples, the lens 1 may also be a plate shape structure with a given radian.

Figure 2:
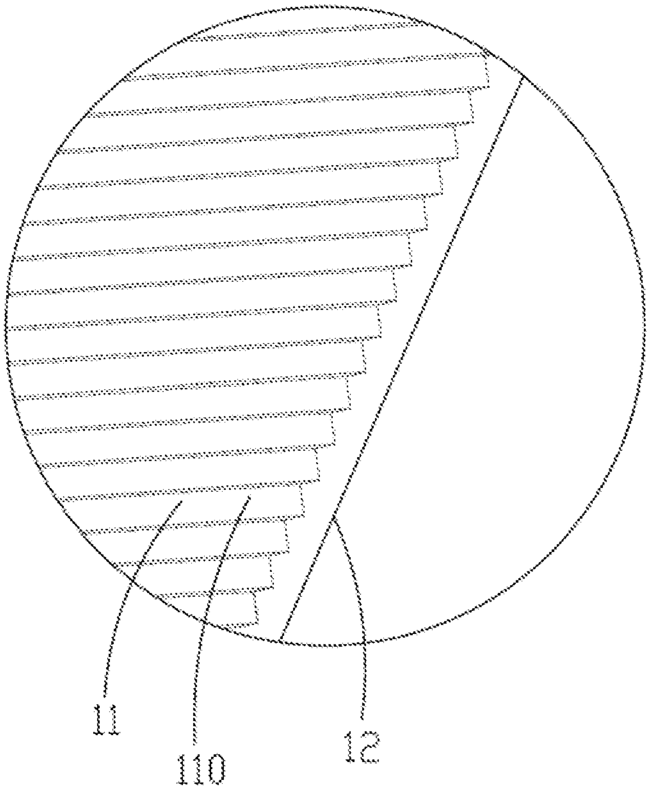
FIG. 2 is an enlarged diagram of part of a lens in the light source module as shown in FIG. 1.

The lens 1 has an inner surface 11, an outer surface 12, a first end surface 13, a second end surface 14, a light entrance 16, which is located at the first end surface 13, of the reflective device, a light exit 17 which is located at the second end surface 14 of the lens 1, and an optical space formed among the light entrance 16, the light exit 17 and the inner surface of the lens 1. The diameter of the light entrance 16 is smaller than the diameter of the light exit 17, and the light source board 21 encloses the light entrance 16. With reference to FIG. 2, the inner surface 11 comprises a plurality of sawtooth structures 110 arranged to be parallel and continuous; each of the sawtooth structures 110 comprises a first refractive surface 111 and a second refractive surface 112 which are intersected, and a ridge line (not marked with a numeral) formed by intersecting of the first refractive surface 111 and the second refractive surface 112; and two ends of each of the sawtooth structures 110 respectively extend to the first end surface 13 and the second end surface 14. In the present example, the first refractive surface 111 and the second refractive surface 112 are perpendicular to each other. In other examples, the angle between the first refractive surface 111 and the second refractive surface 112 may be smaller or greater than 90°, and the light efficiency is optimum when the angle is equal to 90°. Specifically, the inner surface 11 of the lens 1 is both a light-incident surface and a light-exit surface. The outer surface 12 is a smooth wall surface, and serves as a reflective surface. The lens 1 is a transparent structure, and is integrally formed by plastics or glass material, in which plastics material may selected from PMMA, PC, and the like.

Figure 4:
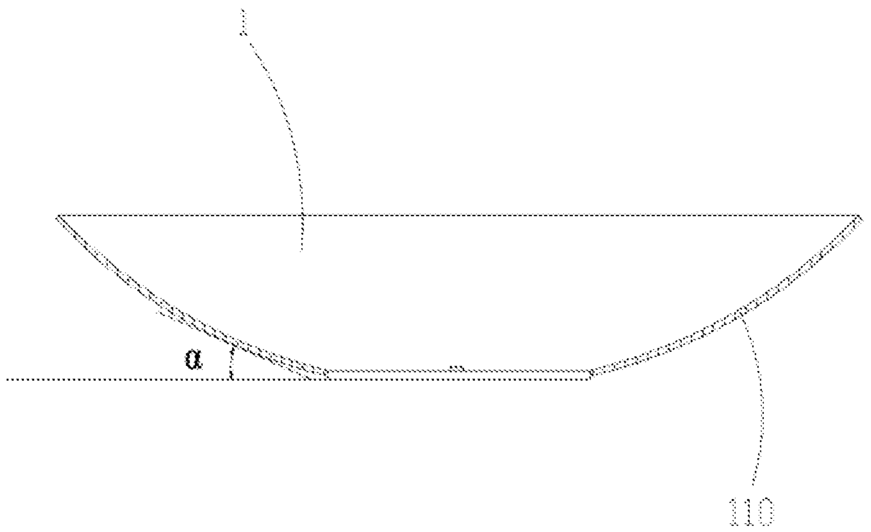
FIG. 4 is a schematic diagram illustrating the case where the ridge line of a lens in the first example of the present disclosure is in an arc shape.
Figure 5:
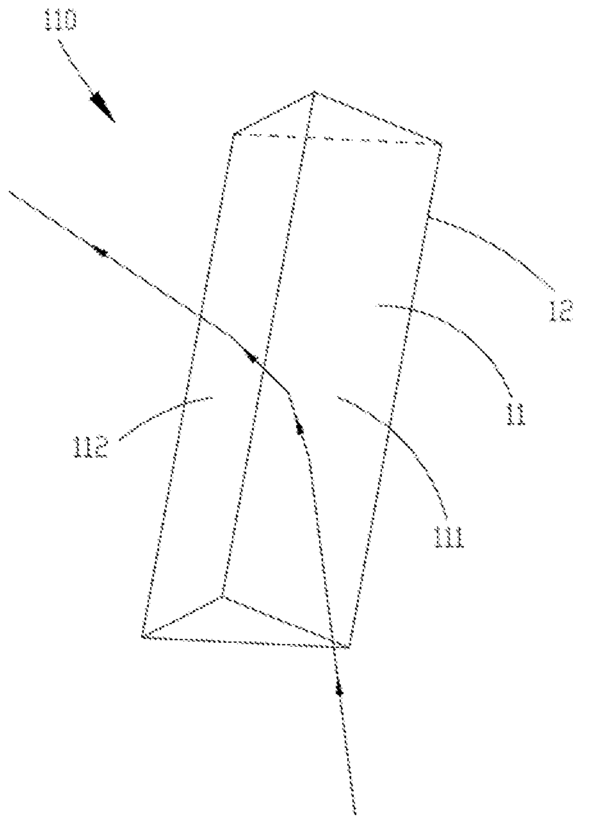
FIG. 5 is a schematic diagram illustrating an optical path in the vertical direction by taking a single sawtooth structure as an example, in the first example of the present disclosure.
Figure 6:
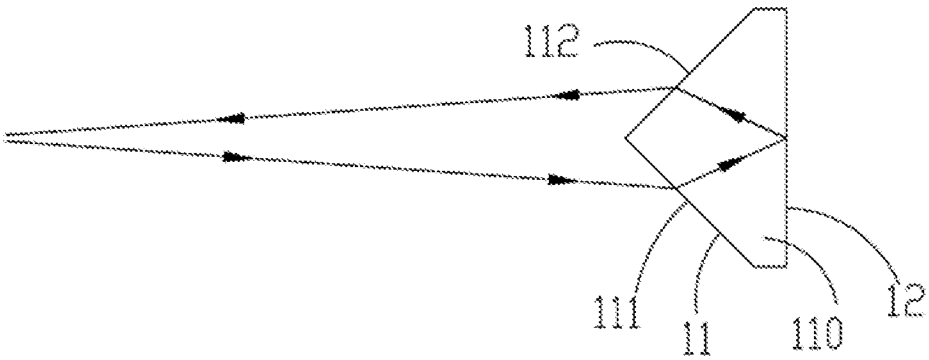
FIG. 6 is a schematic diagram illustrating an optical path in the horizontal direction by taking a single sawtooth structure as an example, in the first example of the present disclosure.

It is known that, to achieve total reflection inside a lens, the incident angle between light and a reflective surface is required to be sufficiently large, otherwise, the light may be transmitted through the lens, and the angle may be changed depending on the material of the lens being used. In order to allow all the light which is incident into the lens 1 to be totally reflected at the outer surface 12, it is needed to plan and design the angle between the light and the outer surface 12. FIG. 6 is a diagram illustrating the optical path of the sawtooth structure along a horizontal direction, it can be seen from FIG. 6 that the incident angle of the light at the outer surface 12 is apparently not enough to allow the total refection to occur. The reason that reflection can be occurred here is that an vertical angle component in a vertical direction exists, as shown in FIG. 3 and refer to the three dimensional diagram as shown in FIG. 5, the incident angle is sufficiently large in the case where an horizontal angle component and the vertical angle component superposes, and therefore, the total reflection can only be achieved when the incident angle in the vertical direction is greater than a given angle. The incident angle in the vertical direction is greater than a given angle, that is, the angle $\alpha$ between the ridge line, which is formed by intersecting of the first refractive surface 111 and the second refractive surface 112, and the plane where the light source board 21 locates needs to be smaller than a given angle A. The description is given from the perspective of the angle of the ridge line is mainly due to the requirements to the angle being different for the cases that the light passes or not passes the ridge line. In the case where the light is incident from the first refractive surface 111 or the second refractive surface 112, refraction occurs, and in this case, the incident angle of the light at the outer surface may be increased; and it is the most difficult to realize the total reflection for the case where the light is incident from a position where the ridge line locates and the horizontal angle component is nearly equal to zero. Under this consideration, in designing the total reflection surface, calculation is performed with the optical path passing through the position where the ridge line locates. The value of A is related to the refractive index of the lens 1. In the present example, the PC material is used, and A is equal to 38°; in the case where the material with larger refractive index is used, the value of A may be increased, and the value of A may be increased to 40° from the perspective of commonly used materials at present; in the case where PMMA is used, A is equal to 30°. For the light source module 100 in the present example, because the lens 1 is in a plate shape, the angle α of the ridge line and the plane where the light source board locates is a fixed value, please refer to FIG. 3. In the case where the structure of the lens varies, as shown in FIG. 4, if the ridge line is an arc line, the angle α between a tangent line of each point on the ridge line and the plane where the light source board locates should satisfy the above-mentioned requirements, that is, the angle α is smaller than A. That is, in the case where the angle α is smaller than A (A is an angle corresponding to the above-mentioned different materials), the lens 1 satisfies the total reflection condition. In other examples that total reflection of the lens is not needed, it is not needed to satisfy the requirements that the angle α is smaller than A, that is, any angle ranged from 0° to 90° may be adopted. In this way, a half transmissive and half reflective effect can be realized at the outer surface 12.

In the present example, the thickness of the lens 1 may be made into 2 millimeter (mm) or even smaller, and therefore, the cost of material can be reduced and the difficultly in formation can be lowered in the case where the size of the structure of the lens 1 is very large. In addition, it should be noted that, during mould designing or formation, a rounded corner may be formed at the intersecting line of the first refractive surface 111 and the second refractive surface 112 of the lens 1 due to machining accuracy problems, and the light which is incident onto the rounded corner may exit through refraction and may form stray light, but the effects of the rounded corner on the overall light efficiency of the lens and the beam angle are not large.

The trend of light after the light emitted from the light-emitting assembly 2 enters into the sawtooth structures 110 will be specifically described in the following.

The light emitted from the light-emitting assembly 2 enters into the sawtooth structure 110 from the light entrance 16, part of light directly exits from the light exit 17, and part of light enters into the optical space after the part of light is reflected by the lens 1, and then exits from the light exit 17. Specific optical paths of the sawtooth structure 110 may refer to FIG. 5 and FIG. 6, the light is incident onto the inner surface 11 of the lens 1, is incident onto the outer surface 12 after refraction by the first refractive surface 111 of the sawtooth structure 110 on the inner surface 11, and incident onto the inner surface 11 through the total reflection of the outer surface 12, enters into the optical space after the refraction by the inner surface 11, and exits from the light exit 17. FIG. 5 illustrates a specific path of the light after the light enters into the sawtooth structure 110. Specifically, the light is incident onto the second refractive surface 112 of the inner surface 11 through the total reflection of the outer surface 12 and then exits. Part of light (not shown in figures) which is also emitted from the light-emitting assembly 2 is incident onto the first refractive surface 111 of the inner surface 11 through the reflection of the outer surface 12 and then exits, or, is incident onto the ridge line formed by intersecting of the first refractive surface 111 and the second refractive surface 112 through the reflection of the outer surface 12 and then exits. In conjunction with FIG. 3, the total reflection can be occurred for all the light which is incident onto the lens 1, as long as the angle α between the ridge line and the plane where the light source board 21 locates is within the angle range corresponding to the above-mentioned different materials, and all the light which is incident onto the lens 1 can exit from the inner surface 11.

The connection plate 15 is also in a plate shape, two sides of the connection plate 15 are attached to side surfaces of the lens 1, the bottom surface of the connection plate 15 is flush with the first end surface 13, the top surface of the connection plate 15 is flush with the second end surface 14, so as to allow the light-emitting assembly 2 to be disposed in the receiving space (not marked with numeral) formed and surrounded by the lens 1 and the connection plate 15, and secondary light distribution of the light emitted from the light-emitting assembly 2 is performed by the lens 1 or the connection plate 15. The surface (that is, the inner surface) of the connection plate 15, which faces the light exit, is a total reflection surface. In order to form a total reflection surface, the connection plate 15 may be formed of materials with total reflection capability, such as plastic and metal; or the total reflection surface may be realized through surface treatment, such as surface polishing, coating treatment.

In summary, for the light source module of the present example, the lenses in the light source module serve as the reflective device, the inner surface of the reflective device comprises the plurality of sawtooth structures arranged continuously, the outer surface of the reflective device is a smooth wall surface, the inner surface serves as both the light incident surface and the light exit surface, the outer surface serves as the reflective surface, and all the light which is incident from the inner surface can exit with optical effect of total reflection when the angle α between the ridge line and the plane where the light source board 21 locates satisfy a given angle A. In this way, the light output efficiency is improved without any electroplating treatment.

Figure 7:
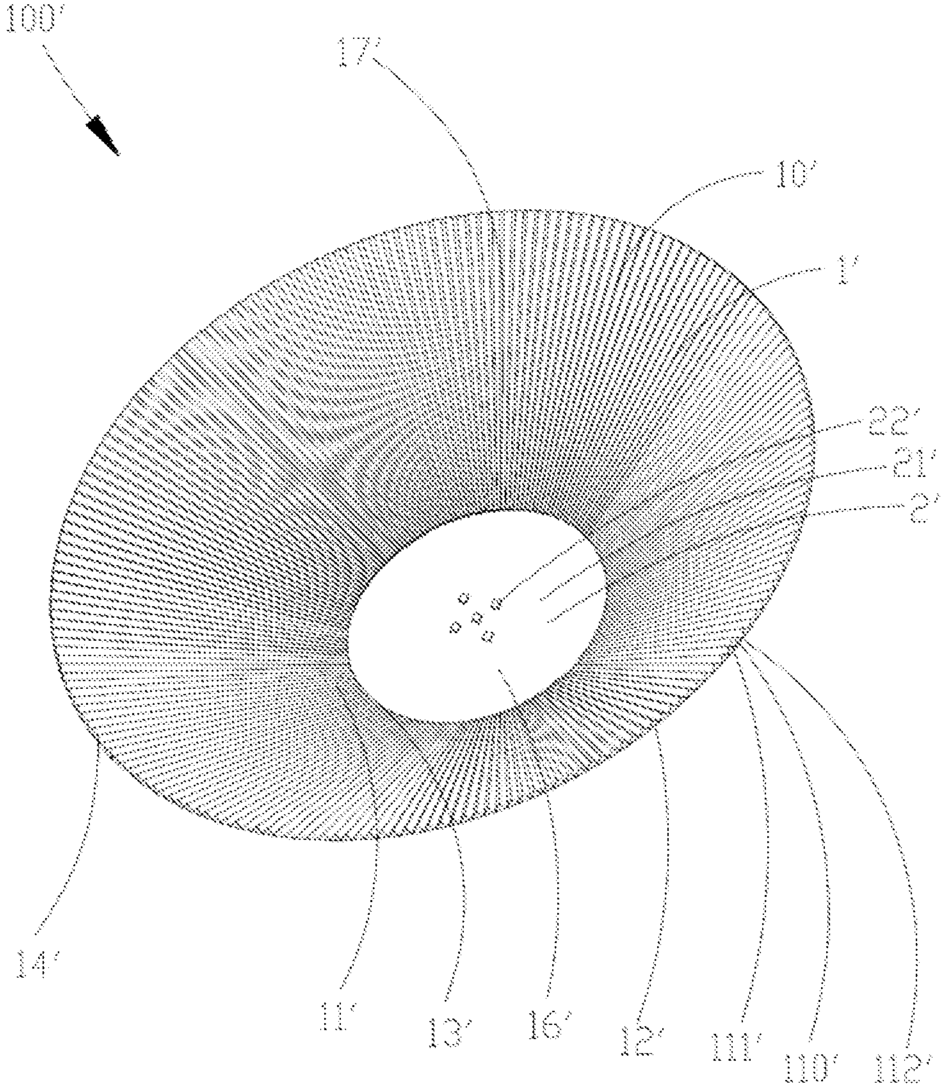
FIG. 7 is a schematically structural view of a light source module provided by a second example of the present disclosure.

As shown in FIG. 7, the second example of the present disclosure provides a light source module 100', which comprises a reflective device 10' with the lens 1' serving as a reflective wall and a light-emitting assembly 2' at an end of the lens 1'. Part of light emitted from the light-emitting assembly 2' directly exits from the inner surface 11' of the lens 1' after the part of light is refracted, reflected, and refracted again by the lens 1', The light source module 100' may be applied in lighting fixtures, such as a downlight, a spotlight, and a ceiling lamp.

The elements in the light source module 100' provided by the second example of the present disclosure, and the connections between the elements will be specifically described in the following.

As shown in FIG. 7, the light-emitting assembly 2' comprises a light source board 21' and light-emitting unit(s) 22' on the light source board 21'. The light-emitting unit(s) 22' is/are provided at the central region of the light source board 21'. One light-emitting unit 22' may be arranged, or a plurality of light-emitting units 22' may be arranged.

Figure 8:
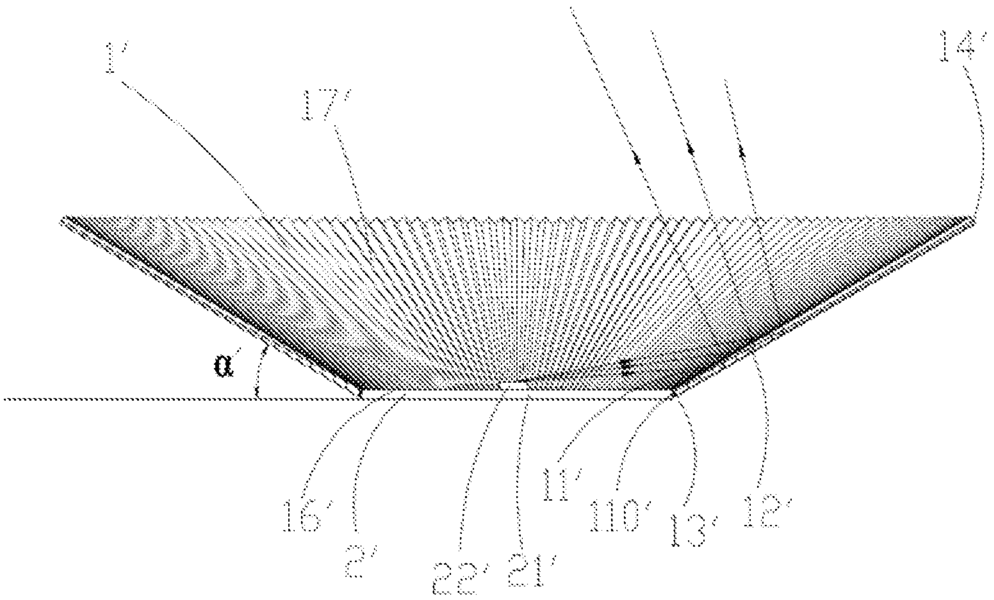
FIG. 8 is a schematic diagram of an optical path of the light source module provided by the second example of the present disclosure.

As shown in FIG. 7 and FIG. 8, the lens 1' is a reflective device 10', is in a trumpet-shape, and has a uniform thickness. The above-mentioned structure is similar to an existing reflector cup, the difference is in that the material of the reflective device 10' adopts a transparent material, and therefore, the appearance of the reflective device 10' is transparent, and it is easy to perform the replacement between the reflective device 10' and existing reflector cup. Specifically, the lens 1' comprises an inner surface 11', an outer surface 12', a first end surface 13', a second end surface 14', a light entrance 16' at the first end surface 13', and a light exit 17' at the second end surface 14'. The diameter of the light entrance 16' is smaller than the diameter of the light exit 17'. The inner surface 11' is formed by a circle of sawtooth structures 110' which are arranged continuously; each of the sawtooth structures 110' comprises a first refractive surface 111' and a second refractive surface 112' intersected with each other, and a ridge line (not marked with numeral) formed by intersecting of the first refractive surface 111' and the second refractive surface 112'. Two ends of each of the sawtooth structures 110' respectively extend to the first end surface 13' and the second end surface 14'. In the present example, the lens 1' is a rotationally symmetric structure, the ridge line formed by intersecting of the first refractive surface 111' and the second refractive surface 112' is a straight line, and the first refractive surface 111' and the second refractive surface 112' are perpendicular to each other. In other examples, the ridge line formed by intersecting of the first refractive surface 111' and the second refractive surface 112' may be an arc line, and the angle between the first refractive surface 111' and the second refractive surface 112' may be smaller than or greater than 90°, and the light efficiency is optimum when the angle is equal to 90°. Specifically, the inner surface 11' of the lens 1' is both a light incident surface and a light-exit surface. The outer surface 12' is a smooth wall surface. The lens 1' is a transparent structure, and is integrally formed by plastics material or glass material, in which plastics material may be selected from PMMA, PC, and the like.

Figure 9:
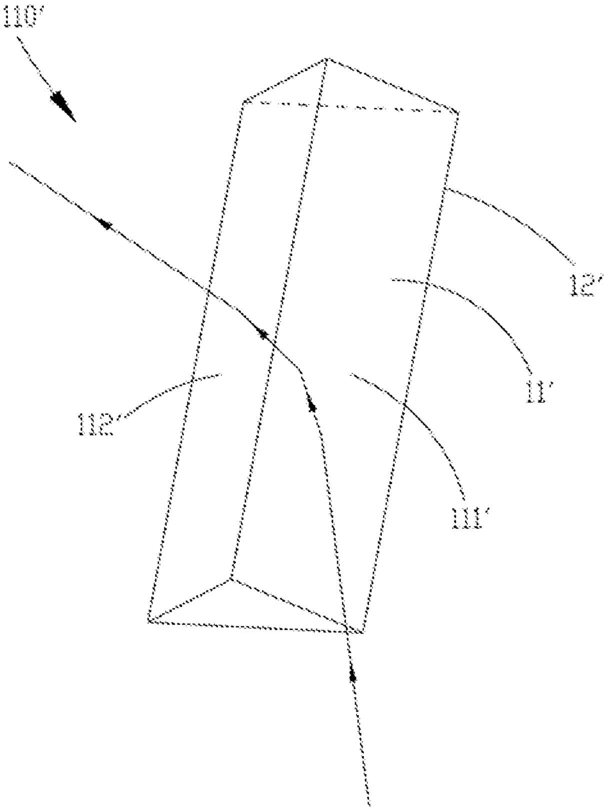
FIG. 9 is a schematic diagram illustrating an optical path in the vertical direction by taking a single sawtooth structure as an example, in the second example of the present disclosure.
Figure 10:
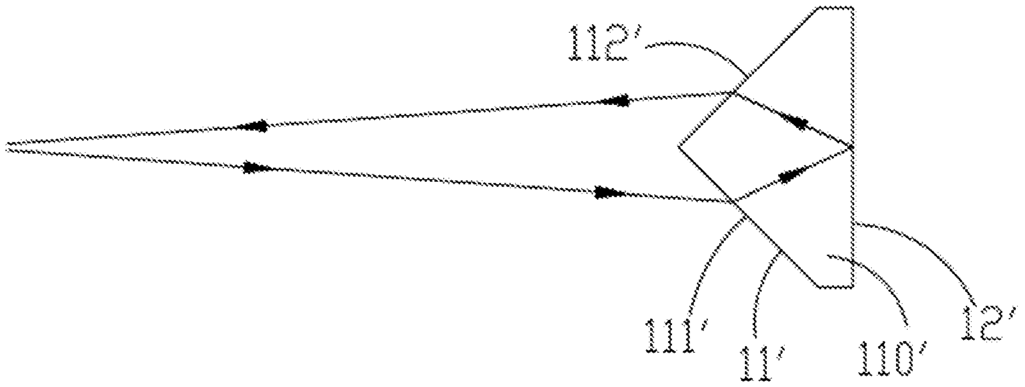
FIG. 10 is a schematic diagram illustrating an optical path in the horizontal direction by taking a single sawtooth structure as an example, in the second example of the present disclosure.

It is known that, to achieve total reflection inside a lens, the incident angle between light and a reflective surface is required to be sufficiently large, otherwise, the light may transmit through the lens, and the angle may be changed depending on the material of the lens being used. In order to allow all the light which is incident into the lens 1' to be totally reflected at the outer surface 12', it is needed to plan and design the angle between the light and the outer surface 12'. FIG. 10 is a diagram illustrating the optical path of the sawtooth structure along a horizontal direction, it can be seen from FIG. 10 that the incident angle of the light at the outer surface 12' is apparently not enough to allow a total refection to occur. The reason that reflection can be occurred here is that an vertical angle component in a vertical direction exists, as shown in FIGS. 8 and 9, the incident angle is sufficiently large in the case where an horizontal angle component and the vertical angle component superposes, and therefore, the total reflection can only be achieved when the incident angle in the vertical direction is greater than a given angle. The incident angle in the vertical direction is greater than the given angle, that is, the angle $\alpha'$ between the ridge line, which is formed by intersecting of the first refractive surface 111' and the second refractive surface 112', and the plane where the light source board 21' locates is required to be smaller than a given angle A. In the case where the light is incident from the first refractive surface 111' or the second refractive surface 112', refraction occurs, the incident angle of the light at the outer surface may be increased; and it is the most difficult to realize the total reflection for the case where the light is incident from a position where the ridge line locates and the horizontal angle component is nearly equal to zero. Under this consideration, in designing the total reflection surface, calculation of A is performed with the optical path passing through the position where the ridge line locates. The value of $\alpha'$ is related to the refractive index of the lens 1'. In the present example, the PC material is used, and A is equal to 38°; in the case where the material with larger refractive index is used, A may be 40°; and in the case where PMMA is used, A is 30°. For the light source module 100' in the present example, because each of the sawtooth structures 110' of the lens 1 is in a straight strip shape, the angle $\alpha'$ of the ridge line and the plane where the light source board locates is a constant value; in the case where the ridge line is an arc line, the angle $\alpha'$ of a tangent line of each point on the ridge line and the plane where the light source board locates should satisfy the above-mentioned requirements, that is, the angle $\alpha'$ is smaller than A. In this way, in the case where the angle $\alpha'$ is smaller than the angle A corresponding to the above-mentioned different materials (A is an angle corresponding to the above-mentioned different materials), the lens 1' satisfies the total reflection condition. In other examples that total reflection of the lens is not needed, it is not needed to satisfy the requirements that the angle $\alpha'$ is smaller than A, that is, any angle ranged from 0° to 90° may be adopted. In this way, a half transmissive and half reflective effect can be realized at the outer surface 12'.

In the present example, the minimum thickness of the lens 1' may be 2 millimeter (mm), and therefore, the cost of material can be reduced and the difficultly in formation can be lowered in the case where the size of the structure of the lens 1' is very large. In addition, it should be noted that, during mould designing or mould formation, a rounded corner may be formed at the intersecting line of the first refractive surface 111' and the second refractive surface 112' of the lens 1' due to machining accuracy, and the light which is incident onto the rounded corner may exit through refraction and may form stray light, but the effects of the rounded corner on the overall light efficiency of the lens and the beam angle are not large, in this way, it also can be considered to be a reflective device based on total reflection.

The trend of light after the light emitted from the light-emitting assembly 2' enters into the sawtooth structure 110' will be specifically described in the following.

As shown in FIG. 8-FIG. 10, the light emitted from the light-emitting assembly 2' enters into the sawtooth structure 110' from the light entrance 16', part of light directly exits from the light exit 17', and part of light exits from the light exit 17' after the part of light is reflected by the lens 1'. A specific optical path of the sawtooth structure 110' is concretely described in the following, the light is incident onto the inner surface 11' of the lens 1', is incident onto the outer surface 12' after refraction of the first refractive surface 111' of the sawtooth structure 110' on the inner surface 11', is incident onto the inner surface 11' through the total reflection of the outer surface 12', and exits from the light exit 17' after the refraction of the inner surface 11'. FIG. 9 illustrates a specific trend of the light after the light enters into the sawtooth structure 110'. Specifically, the light is incident onto the second refractive surface 112' of the inner surface 11' through the total reflection of the outer surface 12' and then exits. Part of light (not shown in figures) which is also emitted from the light-emitting assembly 2' is incident onto the first refractive surface 111' of the inner surface 11' through the reflection of the outer surface 12' and then exits, or, is incident onto the ridge line formed by intersecting of the first refractive surface 111' and the second refractive surface 112' through the reflection of the outer surface 12' and then exits. As shown in FIG. 8, total reflection can be occurred for all the light which is incident onto the lens 1', as long as the angle α' between the ridge line and the plane where the light source board 21' locates is within the angle range corresponding to the above-mentioned different materials, and then, all the light which is incident onto the lens 1' can exit from the inner surface 11'.

Alternatively or additionally, the reflective device is in a shape of ring, and the reflective wall has a uniform thickness.

Alternatively or additionally, the first refractive surface and the second refractive surface are perpendicular to each other.

Alternatively or additionally, a ridge line is formed by intersecting of the first refractive surface and the second refractive surface of each of the sawtooth structures, the ridge line being a straight line or an arc line.

Alternatively or additionally, an angle between a tangent line of any point on the ridge line and a plane where the light entrance locates is smaller than A, the A being 40°.

Alternatively or additionally, the A is 38° when the reflective wall is made of PC; and the A is 30° when the reflective wall is made of an acrylic.

Alternatively or additionally, a number of the reflective walls is two, the two reflective walls are opposite to each other, and each of the reflective walls is in a plate shape.

Alternatively or additionally, the reflective device further comprises a connection plate between the reflective walls.

Alternatively or additionally, the outer surface of the reflective wall is a smooth wall surface and the outer surface of the reflective wall is a total reflection surface.

Alternatively or additionally, two ends of each sawtooth structure are extended to the light entrance and/or the light exit.

Alternatively or additionally, the incident light: enters into the reflective wall through refraction of the inner surface, is incident onto the outer surface through refraction of the first refractive surface or the second refractive surface of the sawtooth structure, is incident onto the inner surface back through reflection of the outer surface, enters into the optical space through another refraction of the inner surface, and exits by passing the light exit ultimately.

Alternatively or additionally, refraction of the incident light at the inner surface occurs twice, and reflection of the incident light at the outer surface occurs once.

Alternatively or additionally, the reflective device is in a shape of ring and the reflective wall has a uniform thickness.

Alternatively or additionally, the first refractive surface and the second refractive surface are perpendicular to each other.

Alternatively or additionally, a ridge line is formed by intersecting of the first refractive surface and the second refractive surface of each of the sawtooth structures, the ridge line being a straight line or an arc line.

Alternatively or additionally, a number of the reflective walls is two, the two reflective walls are opposite to each other, and each of the reflective walls is in a plate shape.

Alternatively or additionally, the reflective device further comprises a connection plate between the reflective walls, an inner surface of the connection plate being a total reflection surface.

Alternatively or additionally, the outer surface of the reflective wall is a smooth wall surface and the outer surface of the reflective wall is a total reflection surface.

Alternatively or additionally, two ends of each sawtooth structure are extended to the light entrance and/or the light exit.

Alternatively or additionally, the light-emitting assembly comprises a light source board and a plurality of light-emitting units on the light source board.

Alternatively or additionally, the light source board encloses the light entrance.

Advantages: compared with the prior art, the reflective device provided by the examples of the present disclosure is transparent, the inner surface of the reflective device comprises the plurality of sawtooth structures arranged continuously, the inner surface serves as both the light incident surface and the light exit surface, the outer surface serves as the reflective surface. By this design, all the light which is incident from the inner surface can exit with optical effect of total reflection, and the light output efficiency is improved without any electroplating treatment.

In summary, for the light source module of the present embodiment, the lenses serve as the reflective device, the inner surface of the reflective device comprises the plurality of sawtooth structures arranged continuously, the inner surface serves as both the light incident surface and the light exit surface, and the outer surface serves as the reflective surface. By this design, all the light which is incident from the inner surface can exit with optical effect of total reflection, and the light output efficiency is improved without any electroplating treatment.

The concrete examples as described above further describes the objective, technical solutions, and advantages of the present disclosure in detail. It should be understood that the above description is only specific embodiments of the present disclosure and not intended to limit the present disclosure. Any modification, equivalent replacement, improvement or the like made within the spirit and scope of the present disclosure shall fall within the scope of the present disclosure.

What is claimed is:

1. A reflective device, wherein the reflective device is transparent and comprises a light entrance, a light exit, and a reflective wall between the light entrance and the light exit, wherein the light entrance is smaller than the light exit, wherein the reflective wall comprises an inner surface and an outer surface, the inner surface comprising a plurality of sawtooth structures arranged continuously along a direction from the light entrance to the light exit, each of the sawtooth structures comprising a first refractive surface and a second refractive surface intersected with each other, and two ends of each of the sawtooth structures being respectively extended toward the light entrance and the light exit, wherein a ridge line is formed by intersecting of the first refractive surface and the second refractive surface of each of the sawtooth structures and an angle between the ridge line and a plane where the light entrance locates is smaller than a predetermined degree, and the reflective wall comprises two reflective walls, the two reflective walls are opposite to each other, and each of the reflective walls is in a plate shape that respectively extends from the light entrance to the light exit and the first refractive surface of each of the sawtooth structures permits light to enter the sawtooth structure by getting refracted, the light is then reflected from the outer surface of the sawtooth structure and exits out from the second refractive surface by refraction, and wherein the reflective device comprises a connection plate having a plate shape that surrounds an enclosure space between the two reflective walls and a bottom of the connection plate is flush with one end of the two reflective walls, a plurality of light emitting units are directly disposed on the bottom of the connection plate between the two reflective walls, and an inner surface of the connection plate is a total reflection surface, wherein the plurality of light emitting units are disposed along a first line extending outwardly in a first direction away from a second line, the second line being perpendicular to the first line and extending in a second direction, along a surface of the connection plate, the surface connecting the two reflective walls.

2. The reflective device according to claim 1, wherein the reflective wall has a uniform thickness.

3. The reflective device according to claim 1, wherein the first refractive surface and the second refractive surface are perpendicular to each other.

4. The reflective device according to claim 1, wherein the ridge line comprises a straight line or an arc line.

5. The reflective device according to claim 4, wherein the angle between a tangent line of any point on the ridge line and the plane where the light entrance locates is smaller than 40°.

6. The reflective device according to claim 4, wherein an angle between a tangent line of any point on the ridge line and a plane where the light entrance locates is smaller than 38° when the reflective wall is made of PC; and wherein the angle is smaller than 30° when the reflective wall is made of an acrylic.

7. The reflective device according to claim 1, wherein the reflective wall has a uniform thickness that is smaller than a pre-determined thickness value.

8. The reflective device according to claim 1, wherein the outer surface of the reflective wall is a smooth wall surface and the outer surface of the reflective wall is a total reflection surface.

9. The reflective device according to claim 1, wherein two ends of each sawtooth structure are extended to the light entrance and/or the light exit.

10. A reflective device, wherein the reflective device is transparent and comprises a light entrance, a light exit, and a reflective wall between the light entrance and the light exit, wherein the reflective wall comprises an inner surface and an outer surface, the inner surface comprising a plurality of sawtooth structures arranged continuously along a direction from the light entrance to the light exit, each of the sawtooth structures comprising a first refractive surface and a second refractive surface intersected with each other, two ends of each of the sawtooth structures being respectively extended toward the light entrance and the light exit, an optical space being formed among the light entrance, the light exit and the inner surface of the reflective wall, wherein a ridge line is formed by intersecting of the first refractive surface and the second refractive surface of each of the sawtooth structures and an angle between the ridge line and a plane where the light entrance locates is smaller than a predetermined degree, and the reflective wall comprises two reflective walls, the two reflective walls are opposite to each other, and each of the reflective walls is in a plate shape that respectively extends from the light entrance to the light exit, and the first refractive surface of each of the sawtooth structures permits light to enter the sawtooth structure by getting refracted, the light is then reflected from the outer surface of the sawtooth structure and exits out from the second refractive surface by refraction, wherein the reflective device comprises a connection plate having a plate shape that surrounds an enclosure space between the two reflective walls and a bottom of the connection plate is flush with one end of the two reflective walls, a plurality of light emitting units are directly disposed on the bottom of the connection plate between the two reflective walls, and an inner surface of the connection plate is a total reflection surface, and wherein the reflective device is configured to allow part of incident light, which enters from the light entrance, to be incident onto the reflective wall, to be incident into the optical space by reflection of the reflective wall, and to exit by passing through the light exit; and to allow another part of the incident light, which enters from the light entrance, to directly pass through the optical space and exit from the light exit, wherein the plurality of light emitting units are disposed along a firstline extending outwardly in a first direction away from a second line, the second line being perpendicular to the first line and extending in a second direction, along a surface of the connection plate, the surface connecting the two reflective walls.

11. The reflective device according to claim 10, wherein the incident light:

enters into the reflective wall through refraction of the inner surface, is incident onto the outer surface through refraction of the first refractive surface or the second refractive surface of the sawtooth structure, is incident onto the inner surface back through reflection of the outer surface, enters into the optical space through another refraction of the inner surface, and exits by passing the light exit ultimately.

12. The reflective device according to claim 10, wherein refraction of the incident light at the inner surface occurs twice, and reflection of the incident light at the outer surface occurs once.

13. The reflective device according to claim 10, wherein the reflective wall has a uniform thickness.

14. The reflective device according to claim 11, wherein the first refractive surface and the second refractive surface are perpendicular to each other.

15. The reflective device according to claim 11, wherein the ridge line comprises a straight line or an arc line.

16. The reflective device according to claim 10, wherein the reflective wall has a uniform thickness that is smaller than a pre-determined thickness value.

17. A light source module, comprising: a reflective device and a light-emitting assembly, wherein the reflective device is transparent and comprises a light entrance, a light exit, and a reflective wall between the light entrance and the light exit, wherein the light entrance is smaller than the light exit, wherein the reflective wall comprises an inner surface and an outer surface, the inner surface comprising a plurality of sawtooth structures arranged continuously along a direction from the light entrance to the light exit, each of the sawtooth structures comprising a first refractive surface and a second refractive surface intersected with each other, and two ends of each of the sawtooth structures being respectively extended toward the light entrance and the light exit, and the first refractive surface of each of the sawtooth structures permits light to enter the sawtooth structure by getting refracted, the light is then reflected from the outer surface of the sawtooth structure and exits out from the second refractive surface by refraction, wherein a ridge line is formed by intersecting of the first refractive surface and the second refractive surface of each of the sawtooth structures and an angle between the ridge line and a plane where the light entrance locates is smaller than a predetermined degree, and the reflective wall comprises two reflective walls, the two reflective walls are opposite to each other, and each of the reflective walls is in a plate shape that respectively extends from the light entrance to the light exit, wherein the reflective device comprises a connection plate having a plate shape that surrounds an enclosure space between the two reflective walls and a bottom of the connection plate is flush with one end of the two reflective walls, a plurality of light emitting units are directly disposed on the bottom of the connection plate between the two reflective walls, and an inner surface of the connection plate is a total reflection surface, wherein the plurality of light emitting units are disposed along a first line extending outwardly in a first direction away from a second line, the second line being perpendicular to the first line and extending in a second direction, along a surface of the connection plate, the surface connecting the two reflective walls; and wherein the light-emitting assembly is at the light entrance of the reflective device.

18. The light source module according to claim 17, wherein the light-emitting assembly comprises a light source board and the plurality of light-emitting units on the light source board; and wherein the light source board encloses the light entrance and the connection plate comprises the light source board.

* * * * *